United States Patent
Wu et al.

(10) Patent No.: US 9,137,522 B2
(45) Date of Patent: Sep. 15, 2015

(54) DEVICE AND METHOD FOR 3-D DISPLAY CONTROL

(75) Inventors: Wen-Che Wu, Zhubei (TW); Wen-Hsia Kung, Longtan Township, Taoyuan County (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 559 days.

(21) Appl. No.: 13/560,590

(22) Filed: Jul. 27, 2012

(65) Prior Publication Data
US 2013/0016195 A1    Jan. 17, 2013

Related U.S. Application Data

(63) Continuation-in-part of application No. 13/179,810, filed on Jul. 11, 2011, now Pat. No. 8,482,603.

(30) Foreign Application Priority Data

Jul. 28, 2011    (TW) .............................. 100126864 A

(51) Int. Cl.
    H04N 13/04    (2006.01)
(52) U.S. Cl.
    CPC ................................ H04N 13/0438 (2013.01)
(58) Field of Classification Search
    CPC .................................................... H04N 13/044
    USPC .................. 348/53, 43, 44, 46, 55, 56, 58
    See application file for complete search history.

(56) References Cited

U.S. PATENT DOCUMENTS

| | | | | |
|---|---|---|---|---|
| 5,197,083 | A * | 3/1993 | Gandini et al. | 375/225 |
| 5,471,237 | A * | 11/1995 | Shipp | 348/46 |
| 7,710,910 | B2 * | 5/2010 | Ode et al. | 370/323 |
| 7,796,332 | B2 * | 9/2010 | Ochi | 359/462 |
| 8,310,527 | B2 * | 11/2012 | Ko et al. | 348/55 |
| 8,848,045 | B2 * | 9/2014 | Robinson et al. | 348/58 |
| 2001/0015753 | A1 * | 8/2001 | Myers | 348/51 |
| 2002/0135699 | A1 | 9/2002 | Jacobs | |
| 2005/0111678 | A1 * | 5/2005 | Wada et al. | 381/190 |
| 2006/0023065 | A1 * | 2/2006 | Alden | 348/51 |
| 2007/0182812 | A1 * | 8/2007 | Ritchey | 348/36 |
| 2007/0229395 | A1 | 10/2007 | Slavenburg et al. | |
| 2008/0007614 | A1 * | 1/2008 | Mizuhashi et al. | 348/14.01 |
| 2009/0262186 | A1 * | 10/2009 | Tabata et al. | 348/76 |

(Continued)

FOREIGN PATENT DOCUMENTS

WO    WO 2011/034497 A2    3/2011

*Primary Examiner* — Paulos M Nathnael
(74) *Attorney, Agent, or Firm* — Birch, Stewart, Kolasch & Birch, LLP

(57) ABSTRACT

A control device for three dimensional display has an image processor and a timing signal generator. The image processor is used for receiving a first and a second input image signals to generate a first, a second, and a third output image signals. The first output image signal comprises part of the first input image signal. The second output image signal comprises part of the first input image signal and part of the second input image signal. The third output image signal comprises part of the second input image signal. The timing signal generator is used for generating a first lens control signal for configuring a first lens to be non-opaque when the second output image signal is displayed on a display device, and generating a second lens control signal for configuring a second lens to be non-opaque when the third output image signal is displayed on the display device.

18 Claims, 3 Drawing Sheets

(56) References Cited

U.S. PATENT DOCUMENTS

| | | |
|---|---|---|
| 2010/0238274 A1 | 9/2010 | Kim et al. |
| 2011/0007625 A1* | 1/2011 | Kataoka .................. 370/208 |
| 2011/0164115 A1* | 7/2011 | Bennett et al. ............. 348/46 |
| 2011/0169919 A1* | 7/2011 | Karaoguz et al. ........... 348/46 |
| 2011/0199457 A1* | 8/2011 | Yoshida et al. ............. 348/43 |
| 2011/0279454 A1* | 11/2011 | Huang ..................... 345/426 |
| 2011/0316972 A1* | 12/2011 | Demas et al. ............... 348/43 |
| 2012/0004919 A1* | 1/2012 | Muth ....................... 704/500 |
| 2012/0057133 A1* | 3/2012 | Robinson ................... 353/8 |
| 2014/0184762 A1* | 7/2014 | Mentz et al. ............... 348/56 |

* cited by examiner

DEVICE AND METHOD FOR 3-D DISPLAY CONTROL

CROSS-REFERENCE TO RELATED APPLICATIONS

This application is a continuation-in-part of U.S. application Ser. No. 13/179,810, filed on Jul. 11, 2011 now U.S. Pat. No. 8,482,603 the entirety of which is incorporated herein by reference for all purposes.

This application also claims the benefit of priority to Taiwanese Patent Application No. 100126864, filed on Jul. 28, 2011, the entirety of which is incorporated herein by reference for all purposes.

BACKGROUND

The present disclosure generally relates a display device and, more particularly, to the three dimensional display device and the control device thereof.

Traditional three dimensional image frame signals are displayed on the cathode ray tube (CRT) display devices. The image frame signals for the left eye and the right eye (referred to as left-eye frames and right-eye frames hereinafter for conciseness) are alternately raster-scanned on the CRT display device and the left-eye lens and the right-eye lens of the shutter glasses become non-opaque (e.g., transparent or translucent) correspondingly. By properly configuring the left-eye lens and the right-eye lens of the shutter glasses, the left eye and the right eye of the viewer may only perceive the left-eye frames and the right-eye frames, respectively. The left-eye frames and the right-eye frames are combined in the brain of the viewer and provide the perception of three dimensional depth of the image frames. The term "image" referred in the present disclosure may comprise still pictures, motion pictures, video, or any suitable type of visual expression.

In some display devices, however, the picture elements (pixels) keep displaying the same image data until the pixels are refreshed, e.g., the liquid crystal display (LCD) devices, the liquid crystal projection devices, the organic light emitting diode (OLED) display devices. Therefore, the image data of the right-eye frame displayed on the pixels of the display device are sequentially refreshed into the image data of the left-eye frame when the left-eye lens is non-opaque and the image data of the left-eye frame are sequentially refreshed into the image data of the right-eye frame when the right-eye lens is non-opaque if the traditional lens control mechanism is adopted with these types of display device. The left eye and the right eye of the viewer both perceive image frames mixed with part of a left-eye frame and part of a right-eye frame. The viewer perceives the ghost imaging when watching the three dimensional images on these types of display device and the viewing quality is severely influenced. Therefore, when three dimensional image frame signals are displayed on these types of display devices, the traditional lens control mechanism for the CRT display devices is no longer applicable.

Some approaches try to solve this problem by configuring the lenses of the shutter glasses to be non-opaque only in the vertical blanking interval (VBI). The VBI is the period of time after the image data of one image frame have been refreshed and before the image data of the next image frame start to be refreshed on the display device. Thus, the pixels of the display device are completely refreshed and display only the left-eye frame or the right-eye frame in the VBI. The viewer does not perceive an image frame mixed with part of a left-eye frame and part of a right-eye frame in the VBI.

The VBI is only a short period of time and the brightness of the image frames is not enough if the viewer may only perceive the image frames in the VBI. Some conventional approaches, e.g., the disclosure in U.S. Publication No. 2007/0229395 A1, extend the duration of the VBI to enhance the brightness of the image frames perceived by the viewer. The extended VBI approach, however, is not compatible with current standards and brings the compatibility issues. The display control device and the display device need to be re-designed and realized with special designed components to support the extend VBI approach. The design complexity and the production cost are therefore increased.

SUMMARY

An example embodiment of a control device for a three dimensional display device, comprising: an image processor, for receiving a first and a second input image frame signals to generate a first, a second, and a third output image frame signals; and a timing signal generator, for generating a timing control signal corresponding to the first, the second, and the third output image frame signals; wherein the first output image frame signal comprises at least part of the first input image frame signal; the second output image frame signal comprises at least part of the first input image frame signal and at least part of the second input image frame signal; and the third output image frame signal comprises at least part of the second input image frame signal.

Another example embodiment of a three dimensional display system, comprising: a three dimensional display device for displaying a first, a second, and a third output image frame signals; and a pair of shutter glasses, comprising a first lens and a second lens, the first lens is configured to be non-opaque when the second output image frame signal is displayed on the three dimensional display device, and the second lens is configured to be non-opaque when the third output image frame signal is displayed on the three dimensional display device; wherein the second output image frame signal comprises at least part of the first output image frame signal and at least part of the third output image frame signal.

Another example embodiment of a control method for three dimensional image display device, comprising: receiving a first and a second input image frame signals for generating a first, a second, and a third output image frame signals, wherein the first output image frame signal comprises at least part of the first input image frame signal; the second output image frame signal comprises at least part of the first input image frame signal and at least part of the second input image frame signal; and the third output image signal comprises at least part of the second input image frame signal; displaying the first output image frame signal when a first control signal and a second control signal are a first value; displaying the second output image frame signal when the first control signal is a second value and the second control signal is the first value; and displaying the third output image frame signal when the first control signal is the first value and the second control signal is the second value.

It is to be understood that both the foregoing general description and the following detailed description are example and explanatory only and are not restrictive of the invention, as claimed.

DETAILED DESCRIPTION

Reference will now be made in detail to embodiments of the invention, which are illustrated in the accompanying drawings.

The same reference numbers may be used throughout the drawings to refer to the same or like parts or components/operations. Certain terms are used throughout the description and following claims to refer to particular components. As one skilled in the art will appreciate, a component may be referred by different names. This document does not intend to distinguish between components that differ in name but not in function. In the following description and in the claims, the term "comprise" is used in an open-ended fashion, and thus should be interpreted to mean "include, but not limited to . . . " Also, the phrase "coupled with" is intended to compass any indirect or direct connection. Accordingly, if this document mentioned that a first device is coupled with a second device, it means that the first device may be directly or indirectly connected to the second device through electrical connections, wireless communications, optical communications, or other signal connections with/without other intermediate devices or connection means.

As used herein, the term "and/or" includes any and all combinations of one or more of the associated listed items. In addition, the singular forms "a", "an", and "the" as used herein are intended to include the plural forms as well, unless the context clearly indicates otherwise.

In the specification and drawings, active high signals are used throughout the embodiments for easier explanatory purpose. In other embodiments, the embodiments may be respectively or collective realized with active high signals and/or active low signals. The numbers of elements, relative position of the elements, and the connection of the elements in the present disclosure are illustrative only. People of ordinary skill in the art may understand the element referred in the present disclosure may be realized with one or more electronic components and the function of multiple elements in the present disclosure may also be realized with an electronic component.

Figure 1:
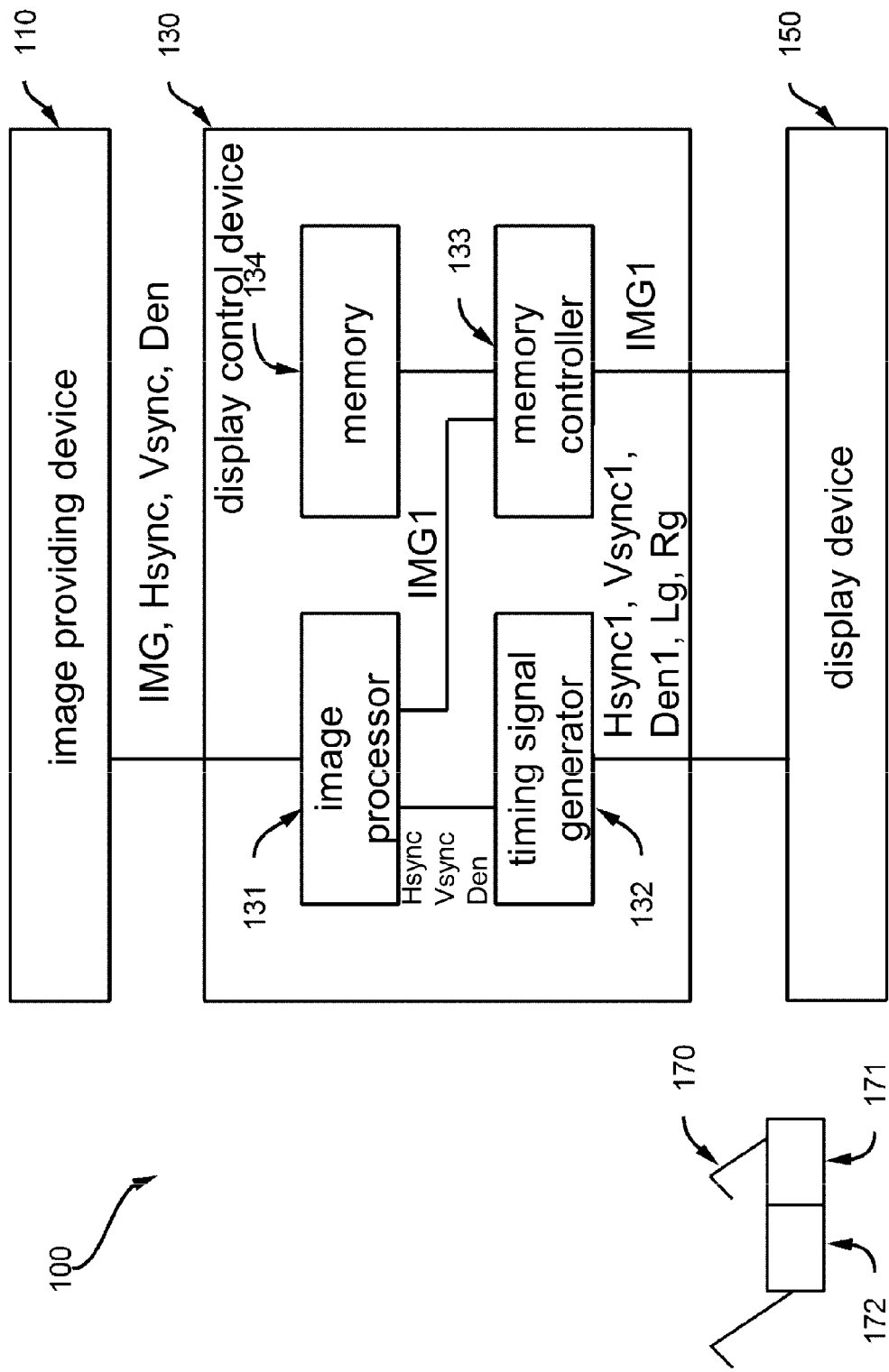
FIG. 1 shows a simplified functional block diagram of an example three dimensional display system.

FIG. 1 shows a simplified functional block diagram of an example three dimensional display system 100, in accordance with at least some embodiments of the present disclosure. The three dimensional display system 100 comprises an image providing device 110, a display control device 130, a display device 150, and a pair of shutter glasses 170. The display control device 130 comprises an image processor 131, a timing signal generator 132, a memory controller 133, and a memory 134. The shutter glasses 170 comprise a left-eye lens 171 and a right-eye lens 172.

The image providing device 110 may be realized with a computer, a multimedia player, a mobile communication device, or other suitable type of device for providing images. The image providing device 110 may transmit two dimensional image frame signals, two dimensional image frame signals in combination with corresponding image depth information, three dimensional image frame signals respectively for the left eye and right eye, and/or associated control signals to the display control device 130.

The display control device 130 may perform signal processing on the received image data and/or the received control signals, and transmit the processed image data and/or the processed control signals to the display device 150. For example, the display control device 130 may convert two dimensional image frame signals into three dimensional image frame signals, the resolution of the image frame signals, and/or the display frequency of the image frame signals.

The display device 150 may display the image frame signals received from the display control device 130. Besides, the pixels of the display device 150 keep displaying the same image data until the pixels are refreshed. For example, the display device 150 may be realized with an LCD device, a liquid crystal projection device, an OLED display device, etc.

The left-eye lens 171 and the right-eye lens 172 of the shutter glasses 170 are configured to be opaque or non-opaque according to the left-eye lens control signal Lg and the right-eye lens control signal Rg, respectively. For example, the left-eye lens control signal Lg and the right-eye lens control signal Rg may be configured to be a first value so that the left-eye lens 171 and the right-eye lens 172 of the shutter glasses 170 are opaque to prevent the viewer from perceiving image frames mixed with part of a left-eye frame and part of a right-eye frame. The left-eye lens control signal Lg may be configured to be a second value and the right-eye lens control signal Rg may be configured to be the first value so that the viewer's left eye may perceive the left-eye frame while the viewer's right eye may not perceive the left-eye frame. The left-eye lens control signal Lg may be configured to be the first value and the right-eye lens control signal Rg may be configured to be the second value so that the viewer's right eye may perceive the right-eye frame while the viewer's left eye may not perceive the right-eye frame. Thus, the viewer may perceive the three dimensional image through the shutter glasses 170.

The image processor 131 may receive the image data from the image providing device 110, e.g., the image frame signal IMG, the horizontal synchronization signal Hsync, the vertical synchronization signal Vsync, the image data refresh signal Den, and/or the control signals for the shutter glasses 170. In this embodiment, the image frame signal IMG comprises the left-eye frame signals and the right-eye frame signals. The image processor 131 transmits the left-eye frame signals and the right-eye frame signals to the memory controller 133, and transmits the timing control signals (e.g., the synchronization signals and the control signals for the shutter glasses 170) to the timing signal generator 132. The image processor 131 may also comprise other signal processing capability, e.g., the function of converting the resolution of the image frame.

The timing signal generator 132 may generate the required timing control signals corresponding to the image frame signals provided by the display control device 130 according to timing control signals received from the image processor 131, e.g., the horizontal synchronization signal Hsync, the vertical synchronization signal Vsync, the image data refresh signal Den, and/or the control signals for the shutter glasses 170. In other embodiment, the timing signal generator 132 may generate the required timing control signals corresponding to the image frame signals provided by the display control device 130 according to predetermined parameters.

The memory controller 133 may receive the image frame signal IMG from the image processor 131 and store the image frame signal IMG in the memory 134. The memory controller 133 may also read the image frame signal IMG from the memory 134 and transmits the image frame signal IMG to the display device 150. In another embodiment, the image processor 131 and the memory controller 133 may also adopt the direct memory access mechanism or other memory access mechanism. Thus, the image frame signal IMG may be received by the memory controller 133 and stored in memory 134 instead of received by the image processor 131 and then transmitted to the memory controller 133. In another embodiment, the image frame signal IMG may be read from the memory 134 by the memory controller 133 and transmitted to the image processor 131. The image processor 131 transmits the received image frame signal IMG to the display device 150. In another embodiment, the image frame signal IMG may be read and transmitted to the display device 150 by the image processor 131 with or without the cooperation of the memory controller 133 and/or the memory 134.

The memory 134 may be realized with any suitable type of volatile and/or nonvolatile memory devices, e.g., DRAM, SRAM, hard drives, and/or flash memory.

The functional blocks and the connections thereof in FIG. 1 are illustrative only. According to different design considerations, the functional blocks may be integrated into one single electronic component and a functional block may also be realized with multiple electronic components. For example, the image processor 131, the timing signal generator 132 and the memory controller 133 may be integrated into an electronic component. The memory 134 may be configured in the interior or the exterior of the display control device 130 according to different design considerations. In another embodiment, the display control device 130 and the display device 150 may be integrated. The image providing device 110, the display control device 130, the display device 150, the image processor 131, the timing signal generator 132, the memory controller 133, and the memory 134 may be respectively or collectively realized with controllers, processors, computers, specific designed discrete or integrated circuit, other suitable type of hardware, and/or the collaboration of hardware and software. Besides, the function blocks mentioned above may be coupled with suitable type of standard and/or custom designed protocols.

Figure 2:
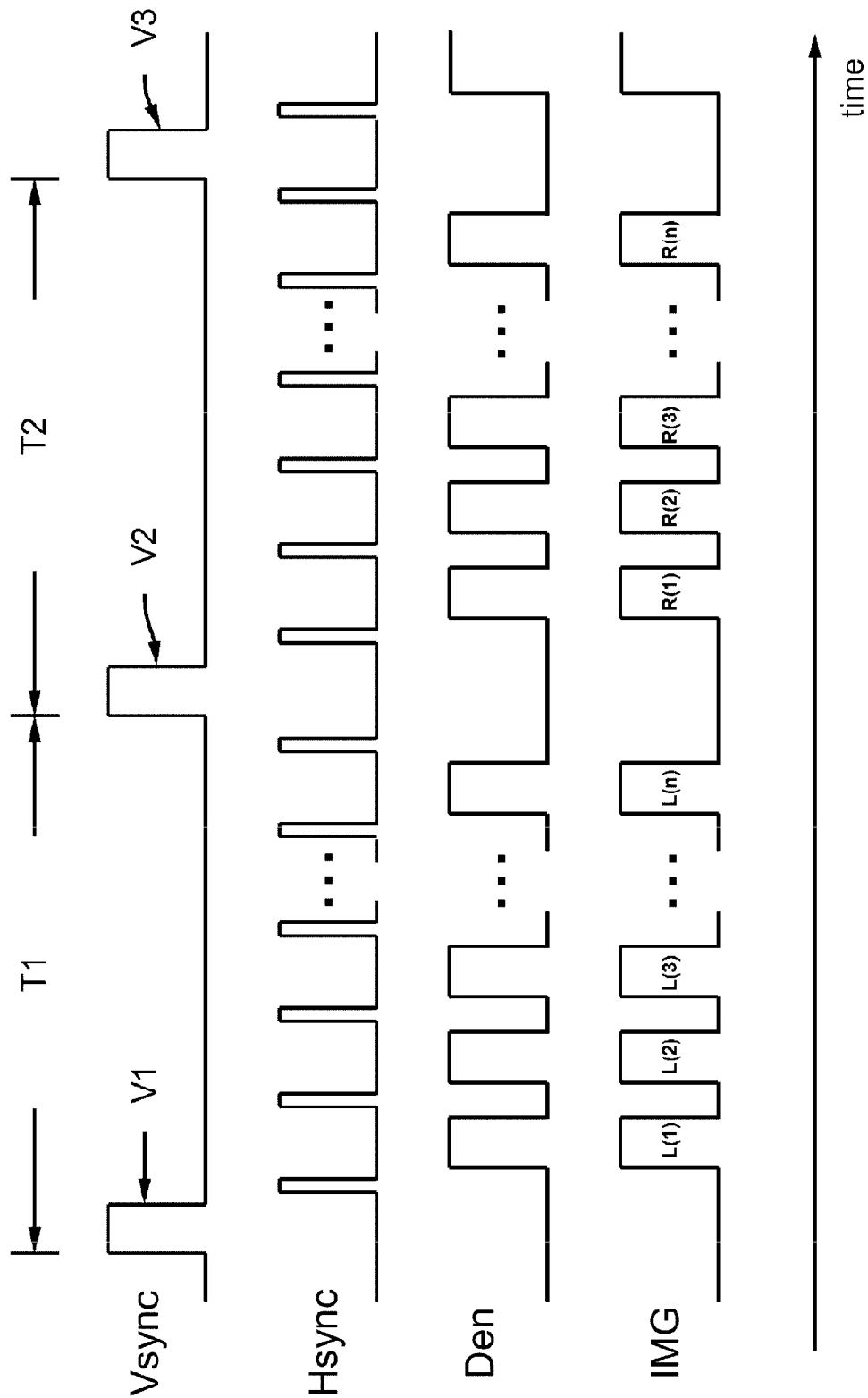
FIG. 2 shows a simplified timing diagram of the signals provided by the image providing device in FIG. 1.
Figure 3:
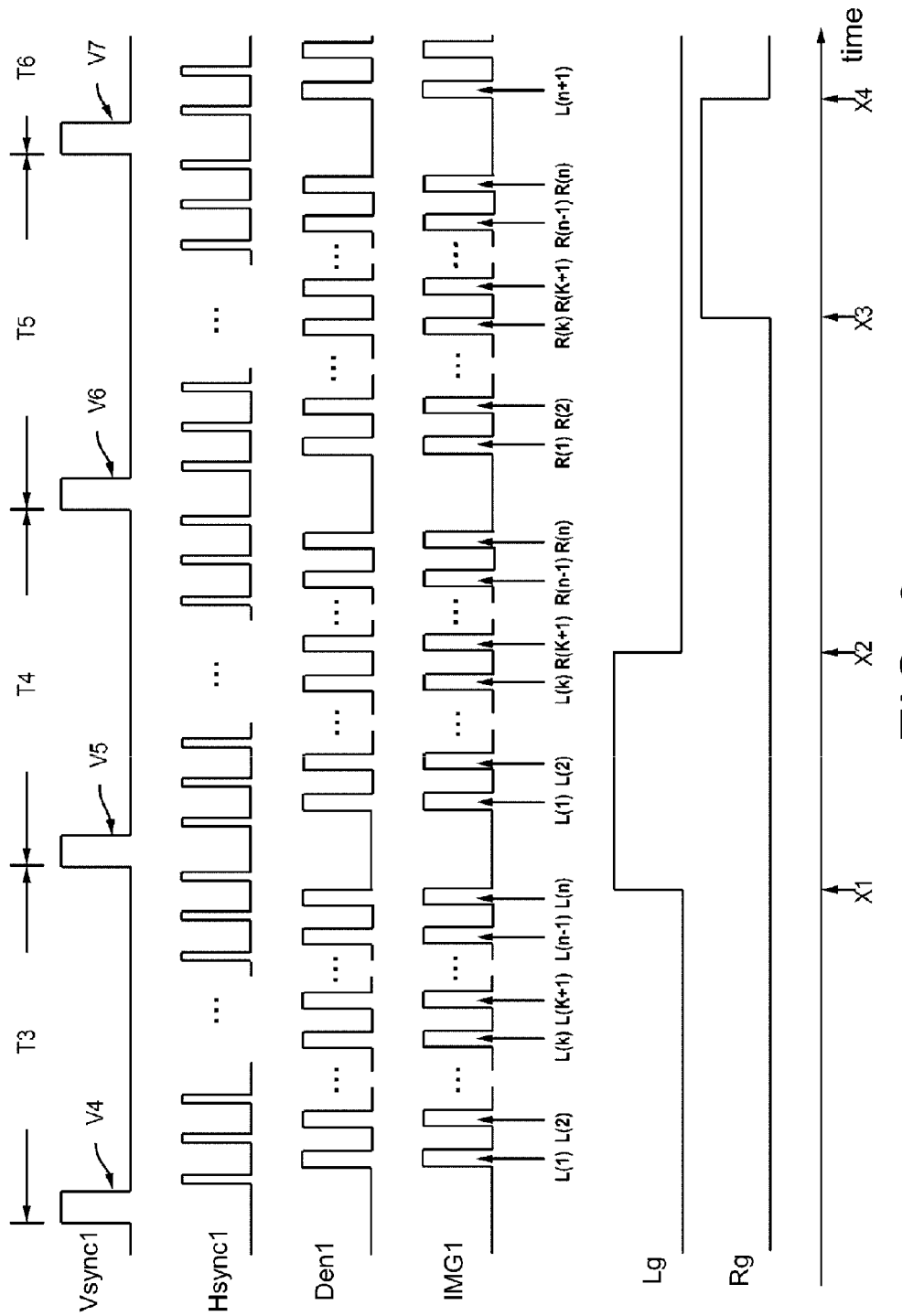
FIG. 3 shows a simplified timing diagram of the signals provided by the display control device in FIG. 1, all arranged in accordance with at least some embodiments of the present disclosure described herein.

FIG. 2 shows a simplified timing diagram of the signals provided by the image providing device 110 in FIG. 1. FIG. 3 shows a simplified timing diagram of the signals provided by the display control device 130 in FIG. 1. The operation of the three dimensional display system 100 is further explained below with FIGS. 1-3. In this embodiment, the display control device 130 converts the received three dimensional image frame signal displayed at 120 Hz into the three dimensional image frame signals displayed at 180 Hz. Moreover, the display control device 130 also generates corresponding timing control signals so that the display device 150 and the shutter glasses 170 may function correctly.

In FIG. 2, the image frame signal IMG provided by the image providing device 110 comprises the left-eye frame signals L(1), L(2), L(3) . . . L(n) and the right-eye frame signals R(1), R(2), R(3) . . . R(n). The timing control signals provided by the image providing device 110 comprise the vertical synchronization signal Vsync, the horizontal synchronization signal Hsync, and the image data refresh signal Den. The image frame signal IMG provided by the image providing device 110 is configured so that the left-eye frames and the right-eye frames are alternately displayed on the display device 150 at a frequency of 120 Hz. That is, the display device 150 displays a left-eye frame in a period of $1/120$ second and alternately displays a right-eye frame in another period of $1/120$ second. The three dimensional images perceived by the viewer therefore have a refresh rate of 60 Hz. Moreover, the frequency of the vertical synchronization signal Vsync is also configured to be 120 Hz in accordance with the 120 Hz frequency of the image frame signal IMG, i.e., the active states of the vertical synchronization signal Vsync occur every $1/120$ second. For example, the period of time T1 between the beginning of the active states V1 and V2 of the vertical synchronization signal Vsync is $1/120$ second, and the period of time T2 between the beginning of the active state V2 and V3 of the vertical synchronization signal Vsync is also $1/120$ second. Moreover, the image data refresh signal Den is configured to be active between the active states of the horizontal synchronization signal Hsync so that the pixels of the display device 150 may alternately display the image data of the left-eye frame and the right-eye frame. For example, the display device 150 refreshes the image data of the pixels to be L(1), L(2), L(3) . . . L(n) in the period of time T1, and refreshes the image data of the pixels to R(1), R(2), R(3) . . . R(n) in the period of time T2.

After the display control device 130 received the image frame signal IMG and the timing control signals in FIG. 2, the image processor 131 transmits the horizontal synchronization signal Hsync, the vertical synchronization signal Vsync, and the image data refresh signal Den to the timing signal generator 132 to generate the timing control signals for a 180 Hz display frequency. As shown in FIG. 3, the vertical synchronization signal Vsync1 generated by the timing signal generator 132 has a 180 Hz frequency, i.e., the active states of the vertical synchronization signal Vsync1 occur every $1/180$ second. For example, the period of time T3 between the beginning of the active states V4 and V5, the period of time T4 between the beginning of the active state V5 and V6, and the beginning of the period of time T5 between the active states V6 and V7 of the vertical synchronization signal Vsync1 are $1/180$ second. Moreover, the timing signal generator 132 also generates the horizontal synchronization signal Hsync1, the image data refresh signal Den1, the left-eye lens control signal Lg, and the right-eye lens control signal Rg.

In this embodiment, the image processor 132 transmits the image frame signal IMG1 to the memory controller 133. The image frame signal IMG1 comprises left-eye frame signals, the right-eye frame signals, and the mixed frame signals. In the mixed frame signals, each of the mixed frames comprises part of a left-eye frame and part of a right-eye frame. The memory controller 133 stores the received image frame signal IMG1 to the memory 134. Moreover, the image processor 131 configures the memory controller 133 to transmit the left-eye frame signals, the mixed frame signals, the right-eye frame signals, and the associated timing control signals generated by the timing signal generator 132 to the display device 150.

In the period of time T3, the display device 150 refreshes the pixels to display the image data L(1), L(2), L(3) . . . L(n) of the left-eye frame according to the left-eye frame signal and associated timing control signals transmitted by the display control device 130. In the period of time T4, the display device 150 refreshes the pixels to display the image data L(1), L(2), L(3) . . . L(k), R(k+1), R(k+2), R(k+3) . . . R(n) of the left-eye frame and the right-eye frame according to the mixed frame signal and associated timing control signals transmitted by the display control device 130. In the period of time T5, the display device 150 refreshes the pixels to display the image data R(1), R(2), R(3) . . . R(n) of the right-eye frame according to the right-eye frame signal and associated timing control signals transmitted by the display control device 130.

From the point of time X1, at which the display device 150 completed refreshing the image data L(n) of the left-eye frame, to the point of time X2, at which the display device 150 starts to refresh the image data R(k+1), the display device 150 keeps displaying the image data L(1), L(2), L(3) . . . L(n) of the left-eye frame. The timing signal generator 132 configures the left-eye lens control signal Lg to be active and configures the right-eye lens control signal Rg to be inactive between the period of time from X1 to X2. Therefore, the left-eye lens 171 of the shutter glasses 170 becomes non-opaque and the right-eye lens 172 of the shutter glasses 170 becomes opaque between the period of time from X1 to X2.

From the point of time X3, at which the display device 150 completed refreshing the image data R(k) of the right-eye frame, to the point of time X4, at which the display device 150 starts to refresh the image data L(n+1), the display device 150 keeps displaying the image data R(1), R(2), R(3) . . . R(n) of the right-eye frame. The timing signal generator 132 configures the right-eye lens control signal Rg to be active and configures the left-eye lens control signal Lg to be inactive between the period of time from X3 to X4. Therefore, the right-eye lens 172 of the shutter glasses 170 becomes non-opaque and the left-eye lens 171 of the shutter glasses 170 becomes opaque between the period of time from X3 to X4.

In FIG. 3, the displayed contents of the display device 150 comprise both the left-eye frame and the right-eye frame except in the periods of time from X1 to X2 and from X3 to X4. Therefore, the timing generator 132 configures the left-eye lens control signal Lg and the right-eye lens control signal Rg to be inactive accordingly so that both lenses may become opaque.

In another embodiment, the time generator 132 may generate the left-eye lens control signal Lg so that the left-eye lens 171 of the shutter glasses 170 becomes non-opaque in at least part of the period from X1 to X2. The time generator 132 may also generate the right-eye lens control signal Rg so that the left-eye lens 172 of the shutter glasses 170 becomes non-opaque in at least part of the period from X2 to X4.

The timing signal generator 132 may transmit the left-eye lens control signal Lg and the right-eye lens control signal Rg to the shutter glasses 170 through wireless or wired connections. In another embodiment, the timing signal generator 132 may transmit the left-eye lens control signal Lg and the right-eye lens control signal Rg to the display device 150, and the display device 150 transmit the lens control signals Lg and Rg to the shutter glasses 170 through wireless or wired connections. Therefore, the left-eye lens 171 and the right-eye lens 172 of the shutter glasses 170 may become opaque or non-opaque at appropriate time corresponding to the output image data of the display device 150.

In another embodiment, the display control device 130 may output the right-eye frame in the period of time T3, the mixed frame in the period of time T4, and the left-eye frame in the period of time T5. The lens control signals Lg and Rg may be configured accordingly to become opaque and non-opaque at appropriate time.

In the above embodiments, the display control device 130 increases the display frequency of the image frame signals IMG1 to be 1.5 times of the original display frequency of the image frame signal IMG so as to generate a left-eye frame, a mixed frame, and a right-eye frame according to a left-eye frame and a right-eye frame. The viewer may perceive the left-eye frame through the left-eye lens 171 of the shutter glasses 170 between the time X1-X2, and perceive the right-eye frame through the right-eye lens 172 of the shutter glasses 170 between the time X3-X4. If the mixed frame comprises fifty percent of the left-eye frame and fifty percent of the right-eye frame, the viewer may have approximately 1/360 second to perceive each of the left-eye frame and right-eye frame. In the conventional approaches, the viewer may only perceive the left-eye frame or right-eye frame when the vertical synchronization signal is active (i.e., in the VBI) so as to prevent from the ghost imaging. Thus, the viewer only has less than 1/1000 second to perceive each of the left-eye frame and right-eye frame in the conventional approaches. The viewer has longer time for perceiving the three dimensional images in the above embodiments and the viewing quality may therefore be enhanced. Moreover, in the above embodiments, the VBI (i.e., the duration of the active state of the vertical synchronization signal Vsync1) does not need to be extended. The display device 150 does not need to be realized with special design components, and therefore the compatibility is better.

In the above embodiments, the mixed frame comprises fifty percent of the left-eye frame and fifty percent of the right-eye frame. In other embodiments, the mixed frame may comprise suitable proportion of left-eye frame and right-eye frame, e.g., thirty percent of the left-eye frame and seventy percent of the right-eye frame.

In the above embodiments, the display frequency of the image frame signal IMG1 is increased to be 1.5 times of the original display frequency of the image frame signal IMG. In other embodiments, the display frequency of the image frame signal IMG1 may be increased by a suitable amount so as to increase the time for the viewer to perceive the three dimensional images and the compatibility may still be maintained by using standard compatible VBI. For example, in other embodiments, the display control device 130 may convert M image frames into M+1 image frames and increase the display frequency to be (M+1)/M of the original display frequency. For example, the display control device 130 converts four image frames into five image frames and increase the 120 Hz display frequency to be 150 Hz, i.e., 5/4 times of the original display frequency. The viewer may therefore have approximately 1/750 second to perceive each of the left-eye frames and the right-eye frames. In still another embodiments, the display device 150 may display the three dimensional images with a refresh rate lower than 60 Hz. For example, the display device 150 may display the left-eye frames, the mixed frames, and the right-eye frames at 120 Hz and the viewer may perceive the three dimensional images at a 40 Hz refresh rate. Moreover, other image processing techniques may be utilized in the above embodiments, e.g., reducing blanking interval and converting image resolution.

In the above embodiments, the frame rate conversion techniques performed by the image processor 131 or the memory controller 133 are well known in the art and may be realized with any suitable approaches. For example, the display control device 131 configures the memory controller 133 to store part of or all of the left-eye frames and the right-eye frames in to the memory 134 with a 120 Hz frequency, and configures the memory controller 133 to read the stored image data from the memory 134 with a 180 Hz frequency so as to output to the display device 150. The memory 134 may comprise multiple line buffers or frame buffers for storing the image frame signals.

In the above embodiments, the standard compatible VBI may be utilized in the three dimensional display system, e.g., the VBI specification defined by the Video Standards Electronics Association (VESA). Therefore, the viewing quality of the three dimensional images may be enhanced without incurring compatibility issues.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A control device for a three dimensional display device, comprising:

an image processor, for receiving a first and a second input image frame signals to generate a first, a second, and a third output image frame signals; and a timing signal generator, for generating a timing control signal corresponding to the first, the second, and the third output image frame signals;

wherein the first output image frame signal comprises at least part of the first input image frame signal; the second output image frame signal comprises at least part of the first input image frame signal and at least part of the second input image frame signal; and the third output image frame signal comprises at least part of the second input image frame signal;

wherein the timing control signal comprises a first lens control signal for configuring a first lens of a pair of shutter glasses to be non-opaque when the second output image frame signal is displayed on the three dimensional display device, and a second lens control signal for configuring a second lens of the shutter glasses to be non-opaque when the third output image frame signal is displayed on the three dimensional display device.

2. The control device of claim 1, wherein the timing signal generator configures the first lens to be non-opaque in a first vertical blanking interval after the first output image frame signal has been refreshed on the three dimensional display device and before the second output image frame signal starts to be refreshed on the three dimensional display device.

3. The control device of claim 2, wherein the timing signal generator configures the first lens to be non-opaque when the part of the first input image frame signal in the second output image frame signal is displayed on the three dimensional display device.

4. The control device of claim 2, wherein the timing signal generator configures the second lens to be non-opaque in a second vertical blanking interval after the third output image frame signal has been refreshed on the three dimensional display device and before a fourth output image frame signal starts to be refreshed on the three dimensional display device.

5. The control device of claim 1, wherein the timing signal generator configures the second lens to be non-opaque when the part of the first input image frame signal in the second output image frame signal has been completely replaced by the part of the second input image frame signal in the third output image frame signal on the three dimensional display device.

6. The control device of claim 1, wherein the image processor further receive a first and a second input synchronization signals corresponding to the first and the second input image frame signals, respectively; the timing signal generator further generate a first, a second, and a third output synchronization signals corresponding to the first, the second, and the third output image frame signals, respectively; the duration between the first and the second input synchronization signals is longer than the duration between the first and the second output synchronization signals; and the duration between the first and the second synchronization signals is longer than the duration between the second and the third output synchronization signals.

7. A three dimensional display system, comprising:

a three dimensional display device for generating and displaying a first, a second, and a third output image frame signals, and the three dimensional display device is further configured to generate a timing control signal corresponding to the first, the second, and the third output image frame signals, wherein the timing control signal comprises a first lens control signal and a second lens control signal; and a pair of shutter glasses, comprising a first lens and a second lens, the first lens is configured to be non-opaque according to the first lens control signal when the second output image frame signal is displayed on the three dimensional display device, and the second lens is configured to be non-opaque according to the second lens control signal when the third output image frame signal is displayed on the three dimensional display device;

wherein the second output image frame signal comprises at least part of the first output image frame signal and at least part of the third output image frame signal.

8. The control device of claim 7, wherein the first lens is configured to be non-opaque after the first output image frame signal has been refreshed on the three dimensional display device and before the second output image frame signal starts to be refreshed on the three dimensional display device.

9. The control device of claim 8, wherein the first lens is configured to be non-opaque when the part of the first output image frame signal in the second output image frame signal is displayed on the three dimensional display device.

10. The control device of claim 8, wherein the second lens is configured to be non-opaque after the third output image frame signal has been refreshed on the three dimensional display device and before a fourth output image frame signal starts to be refreshed on the three dimensional display device.

11. The control device of claim 10, wherein the second lens is configured to be non-opaque when the part of the first output image frame signal in the second output image frame signal has been completely replaced by the part of the third output image frame signal on the three dimensional display device.

12. The control device of claim 7, wherein the second lens is configured to be non-opaque when the part of the first output image frame signal in the second output image frame signal has been completely replaced by the part of the third output image frame signal on the three dimensional display device.

13. A control method for three dimensional image display device, comprising:

receiving a first and a second input image frame signals for generating a first, a second, and a third output image frame signals, wherein the first output image frame signal comprises at least part of the first input image frame signal; the second output image frame signal comprises at least part of the first input image frame signal and at least part of the second input image frame signal; and the third output image signal comprises at least part of the second input image frame signal;

displaying the first output image frame signal when a first lens control signal and a second lens control signal are a first value;

displaying the second output image frame signal when the first lens control signal is a second value and the second lens control signal is the first value;

controlling a first lens of a pair of shutter glasses to be non-opaque according to the first lens control signal when the second output image frame signal is displayed on the three dimensional display device;

displaying the third output image frame signal when the first lens control signal is the first value and the second lens control signal is the second value; and controlling a second lens of the shutter glasses to be non-opaque according to the second lens control signal when the third output image frame signal is displayed on the three dimensional display device.

14. The control method of claim 13, further comprising:
configuring the first lens to be non-opaque in a first vertical blanking interval after the first output image frame signal has been refreshed on the three dimensional display device and before the second output image frame signal starts to be refreshed on the three dimensional display device.

15. The control method of claim 13, further comprising:
configuring the first lens to be non-opaque when the part of the first input image frame signal in the second output image frame signal is displayed on the three dimensional display device.

16. The control method of claim 13, further comprising:
configuring the second lens to be non-opaque in a second vertical blanking interval after the third output image frame signal has been refreshed on the three dimensional display device and before a fourth output image frame signal starts to be refreshed on the three dimensional display device.

17. The control method of claim 13, further comprising:
configuring the second lens to be non-opaque when the part of the first input image frame signal in the second output image frame signal has been completely replaced by the part of the second input image frame signal in the third output image frame signal on the three dimensional display device.

18. The control method of claim 13, further comprising:

receiving a first and a second input synchronization signals corresponding to the first and the second input image frame signals, respectively;

generating a first, a second, and a third output synchronization signals corresponding to the first, the second, and the third output image frame signals, respectively;

configuring the duration between the first and the second output synchronization signals to be shorter than the duration between the first and the second input synchronization signals; and configuring the duration between the second and the third output synchronization signals to be shorter than the duration between the first and the second input synchronization signals.

* * * * *